No. 800,054. PATENTED SEPT. 19, 1905.
H. C. AYRES.
CONDUIT FOR ELECTRICAL CONDUCTORS.
APPLICATION FILED MAR. 13, 1905.
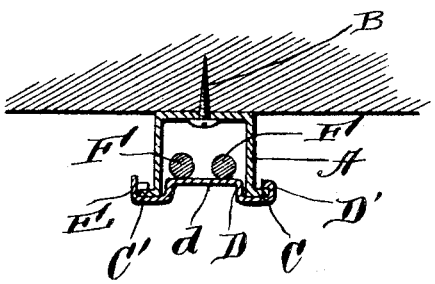
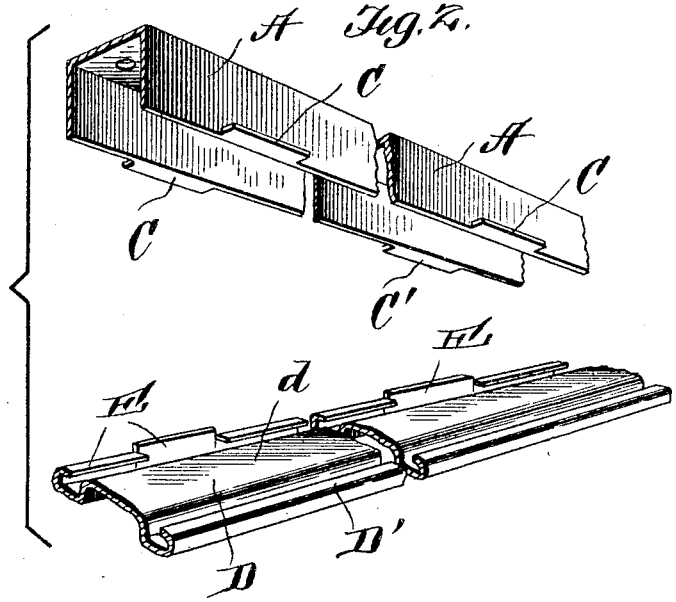

UNITED STATES PATENT OFFICE.

HENRY C. AYRES, OF GREENVILLE, OHIO, ASSIGNOR TO THE ADJUSTABLE FIXTURE AND MANUFACTURING COMPANY, OF GREENVILLE, OHIO.

CONDUIT FOR ELECTRICAL CONDUCTORS.

No. 800,054.     Specification of Letters Patent.     Patented Sept. 19, 1905.

Application filed March 13, 1905. Serial No. 249,907.

*To all whom it may concern:*

Be it known that I, HENRY C. AYRES, a citizen of the United States, residing at Greenville, in the county of Darke and State of Ohio, have invented certain new and useful Improvements in Conduits for Electrical Conductors; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in conduits for electrical conductors; and the object of the invention is to produce a neat and compact metallic casing having an ornamental effect, which is adapted to be held either to the ceiling or side of a room, and affording mechanism whereby access may be readily had to a conductor.

The invention consists, further, in various details of construction and in combinations and arrangements of parts, which will be hereinafter fully described and then specifically defined in the appended claim.

My invention is illustrated in the accompanying drawings, in which—

Figure 1 is a cross-sectional view through my improved conduit, showing the cover as applied thereto. Fig. 2 is a perspective view showing the detailed construction of the apparatus and the manner in which the cover is held to the conduit.

Reference now being had to the details of the drawings by letter, A designates the conduit, which is made, preferably, of metal and is adapted to be held to the ceiling or wall of a room by means of screws B. The edges of said conduit, which is trough-shaped, have at intervals flanges C and C', which are located opposite each other in pairs, and D designates a cover, one longitudinal edge of which is bent to form a curved flange portion D', which is adapted to hook over the flanges C upon the conduit A and disposed at intervals from one another, as shown. The opposite edge of the cover from that having the flange D' is provided with flanges E, which are opposite the flange D' and are adapted to be bent over the flange-section C' for the purpose of holding the cover securely to the conduit.

The portion *d* intermediate the flanges along the opposite longitudinal edges of the cover is adapted to snugly fit between the side walls of the conduit, as shown in the cross-sectional view of the drawings, and afford a substantial support for the conductor-wires F, as will be readily understood.

While I have shown a particular detailed form of device illustrating my invention, it will be understood that I may vary the same, if desired, without in any way departing from the spirit of the invention.

Having thus fully described my invention, what I claim as new, and desire to secure by Letters Patent, is—

A metallic conduit for electric wiring, comprising a casing open upon one side and having flanges spaced apart upon the outer faces of the side of said conduit, a cover, having its opposite longitudinal edges turned into rolls adapted to engage said flanges, portions of one of said rolls being slitted and bent over the flanges upon one side of said conduit, the space intermediate the opposite longitudinal curved edges of said cover adapted to fit between the two walls of said conduit and form a support for conductor-wires, as shown and described.

In testimony whereof I hereunto affix my signature in presence of two witnesses.

HENRY C. AYRES.

Witnesses:
    A. L. HOUGH,
    FRANKLIN H. HOUGH.